United States Patent [19]
Nakata

[11] Patent Number: 5,446,358
[45] Date of Patent: Aug. 29, 1995

[54] STEPPING MOTOR CONTROL SYSTEM

[75] Inventor: Kazuhiro Nakata, Tokyo, Japan

[73] Assignee: Canon Kabushiki Kaisha, Tokyo, Japan

[21] Appl. No.: 99,007

[22] Filed: Jul. 29, 1993

[30] Foreign Application Priority Data

Jul. 30, 1992 [JP] Japan ................................. 4-203863

[51] Int. Cl.⁶ ............................................. H02P 8/00
[52] U.S. Cl. ................................... 318/696; 318/599; 318/567
[58] Field of Search ............... 318/567, 696, 685, 254, 318/811, 138, 599, 632

[56]      References Cited
        U.S. PATENT DOCUMENTS

| | | | |
|---|---|---|---|
| 4,233,549 | 11/1980 | Dighe | 388/819 |
| 4,338,558 | 7/1982 | Okamatsu et al. | 318/811 |
| 4,622,603 | 11/1986 | Mizunuma et al. | 360/78 |
| 4,651,068 | 3/1987 | Meshkat-Razavi | 318/254 |
| 4,710,691 | 12/1987 | Borgstrom et al. | 318/685 |
| 4,791,344 | 12/1988 | Yashida et al. | 318/567 |
| 5,283,510 | 2/1994 | Tamaki et al. | 318/696 |

FOREIGN PATENT DOCUMENTS

| | | |
|---|---|---|
| 0311095 | 4/1989 | European Pat. Off. . |
| 0460776 | 12/1991 | European Pat. Off. . |
| 2721630 | 3/1979 | Germany . |

OTHER PUBLICATIONS

Patent Abstracts of Japan, vol. 9, No. 154, pub'd Jun. 28, 1985, English Abstract of Japanese Patent 60-0342597.
Patent Abstracts of Japan, vol. 5, No. 110, pub'd Jul. 17, 1981, English Abstract of Japanese Patent 56-051689.
Patent Abstracts of Japan, vol. 11, No. 119, pub'd Apr. 14, 1987, English Abstract of Japanese Patent 61-266097.

*Primary Examiner*—John W. Cabeca
*Attorney, Agent, or Firm*—Fitzpatrick, Cella, Harper & Scinto

[57]      ABSTRACT

A duty factor of a pulse is set in accordance with duty factor data at each timing determined by a timer function to change the duty factor of the pulse in one step of the drive of a stepping motor in order to control the motor power in open loop.

6 Claims, 6 Drawing Sheets

| ADDRESS | ① | ② | ③ | ④ | ⑤ | ⑥ | ⑦ | ⑧ |
|---------|---|---|---|---|---|---|---|---|
| DUTY | 40 | 60 | 70 | 80 | 70 | 60 | 40 | 20 |

FIG. 7

| N | P | ① | ② | ③ | ④ | ⑤ | ⑥ | ⑦ | ⑧ |
|---|---|---|---|---|---|---|---|---|---|
| 1 | 5000 | 45 | 50 | 55 | 60 | 45 | 40 | 35 | 10 |
| 2 | 3830 | 30 | 40 | 50 | 60 | 55 | 45 | 35 | 20 |
| 3 | 2730 | 40 | 50 | 60 | 65 | 60 | 50 | 40 | 20 |
| 4 | 2240 | 45 | 55 | 60 | 65 | 60 | 50 | 40 | 20 |
| 5 | 1950 | | | | | | | | |
| 6 | 1750 | | | | | | | | |
| 7 | 1600 | | | | | | | | |
| 8 | 1480 | | | | | | | | |
| 9 | 1390 | | | | | | | | |
| 10 | 1310 | 70 | 75 | 80 | 80 | 75 | 65 | 50 | 20 |

STEPPING MOTOR CONTROL SYSTEM

BACKGROUND OF THE INVENTION

1. Field of the Invention

The present invention relates to a stepping motor control system, and more particularly to a stepping motor control system operating a motor in a plurality of operation modes, that is, when an operation is conducted by slow up/down means or when a constant speed operation is conducted at a plurality of speeds.

2. Related Background Art

A constant voltage drive system has been known as a stepping motor drive system. Because this system had the simplest circuit configuration and is most inexpensive, it has been widely used.

On the other hand, a constant current system has been known as a drive system for producing a high speed rotation. In this system, a current flowing in a motor winding is detected to control it to a preset current level by driving a switching device such as a transistor by pulse width modulation.

However, in a stepping motor drive circuit using by the former constant voltage system, when the drive frequency of the stepping motor rises, the rise of the current is slow due to the inductance of the motor winding, which causes a reduction of a torque. As a result, a high speed rotation is not attained.

In the latter constant current system, the high speed operation of the motor is attained but because of necessity of the current detection function, the circuit is complex and its cost is high.

In general, the higher the rotation speed of the stepping motor, the smaller the generated torque. Accordingly, when the current is set to generate the torque required in a high speed rotation mode, the motor vibrates in a low rotation speed mode because of an excessive torque and noise is readily generated. In order to solve this problem, it is necessary to set different current levels in accordance with the rotation speed. This increases the complexity of the circuit.

SUMMARY OF THE INVENTION

It is an object of the present invention to permit driving of a stepping motor with a low vibration and low noise by switching a duty factor thereof in steps.

Other objects of the present invention will be apparent from the following detailed description of the embodiments.

BRIEF DESCRIPTION OF THE DRAWINGS

Fig. 7 shows a format of PWM duty factor data stored in a ROM in accordance with a third embodiment of the present invention.

DETAILED DESCRIPTION OF THE PREFERRED EMBODIMENTS

<Embodiment 1>

The preferred embodiments of the present invention are now explained. First, a first embodiment of the present invention is explained with reference to FIGS. 1 to 4.

Figure 1:
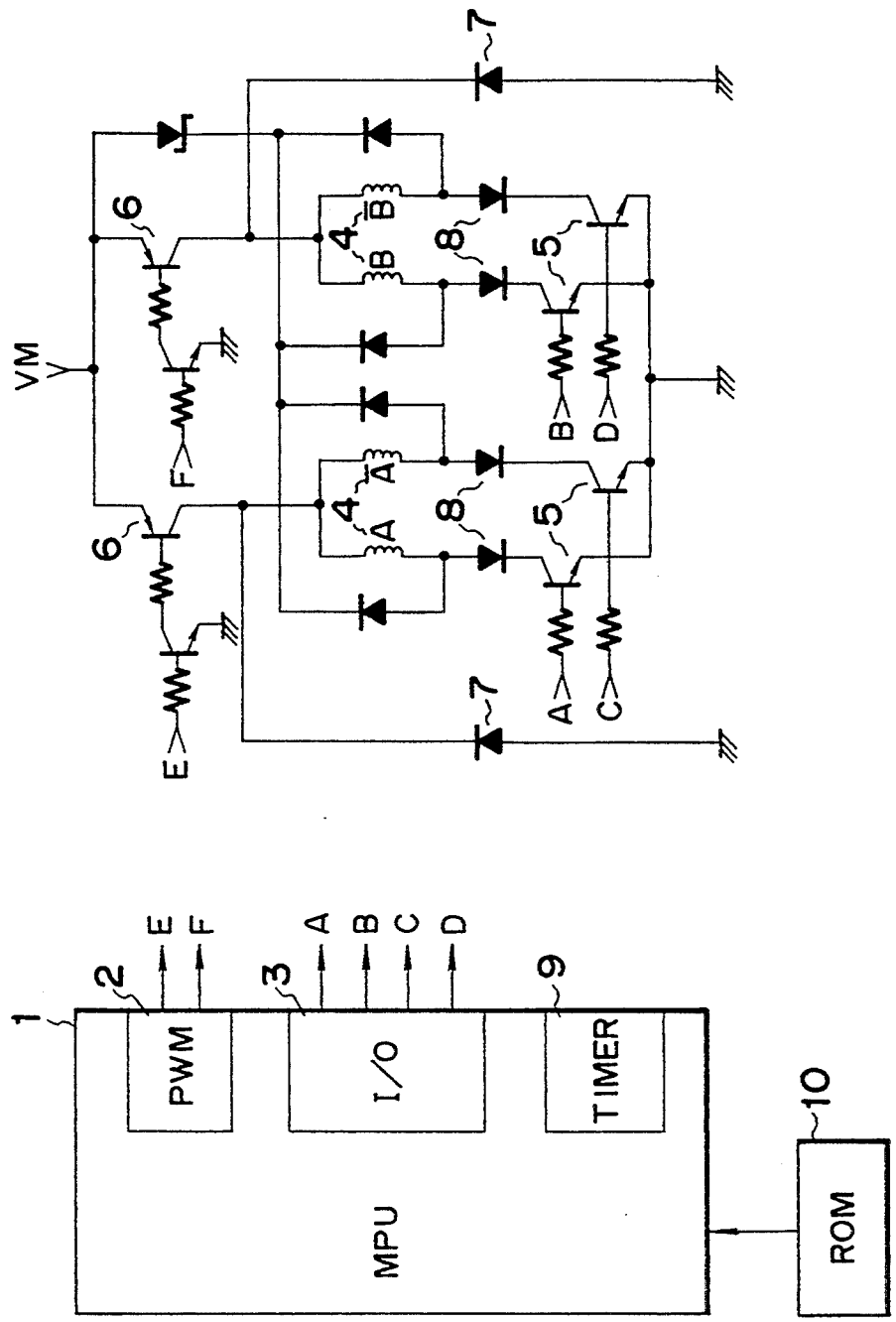
FIG. 1 shows a drive circuit of a stepping motor in accordance with a first embodiment of the present invention.

FIG. 1 shows a drive circuit of a stepping motor. In FIG. 1, numeral 1 denotes a microcontroller for controlling the motor, numeral 2 denotes a pulse width modulation unit (hereinafter a PWM unit) built in the microcontroller 1 for producing variable frequency and variable duty factor pulse signals E and F, numeral 3 denotes an output port built in the microcontroller 1 for generating coded stepping motor drive signals A, B, C and D, numeral 4 denotes a unipolar-connected 2-phase stepping motor, numeral 5 denotes a transistor for exciting the stepping motor 4 by the drive signals A, B, C and D, numeral 6 denotes a current control transistor for controlling a current flowing in the stepping motor 4 by pulse signals E and F, numeral 7 denotes a flywheel diode for establishing a path for the flow of a current when the current control transistor 6 is turned off, numeral 8 denotes a diode for preventing the occurrence of a back current by an induced voltage in the winding of the stepping motor 4, numeral 9 denotes a programmable timer unit built in the microcontroller 1, and numeral 10 denotes a ROM which stores data such as drive speeds of the motor 4 and the PWM duty factors. The data is read by the microcontroller 1.

Figures 2, 3:
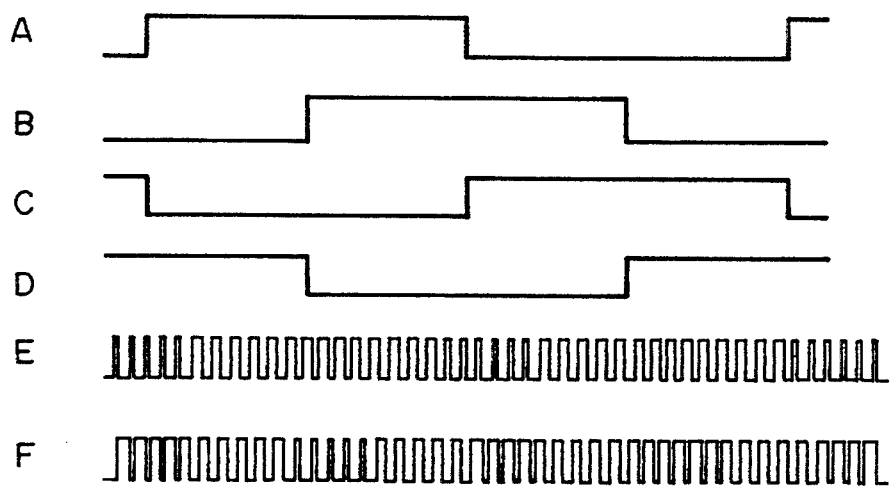
FIG. 2 shows control signal waveforms of the stepping motor shown in FIG. 1.
FIG. 3 shows a format of PWM duty factor data stored in a ROM shown in FIG. 1.

Waveforms of control signals for controlling the stepping motor 4 are shown in FIG. 2. The microcontroller 1 generates the control signals A, B, C and D for driving the stepping motor 4 in a 2-phase excitation from the output port 3. When those control signals are at H level, the transistors 5 connected to those control signals are turned on and the corresponding windings of the stepping motor 4 are excited. A timing to change the control signals, that is, a step time is determined by the microcontroller 1 by using the timer unit 9. By adjusting the step time, modes such as acceleration, deceleration and constant speed operation are controlled.

The microcontroller 1 supplies the pulse waveforms E and F to the PWM unit 2. Those pulse waveforms are outputted according to a predetermined duty cycle at a constant timing at a frequency of 20 KHz or higher, which is higher than the audible range for human being's ear. A timing to change the duty factor is also determined by the microcontroller 1 by using the timer unit 9. When the pulse output is at the H level, the current control transistor 6 is turned on and it supplies power to the motor 4. When it is off, the power stored in the motor 4 is discharged through the flywheel diode 8. By repeating the above operations, the current flowing in the winding of the motor 4 is controlled by the duty factors of the pulse waveforms E and F.

An example of the data of the PWM duty factors stored in the ROM 10 is shown in FIG. 3. Numerals 1 to 8 in an upper line are ROM addresses which are assigned for the sake of convenience.

Figure 4:
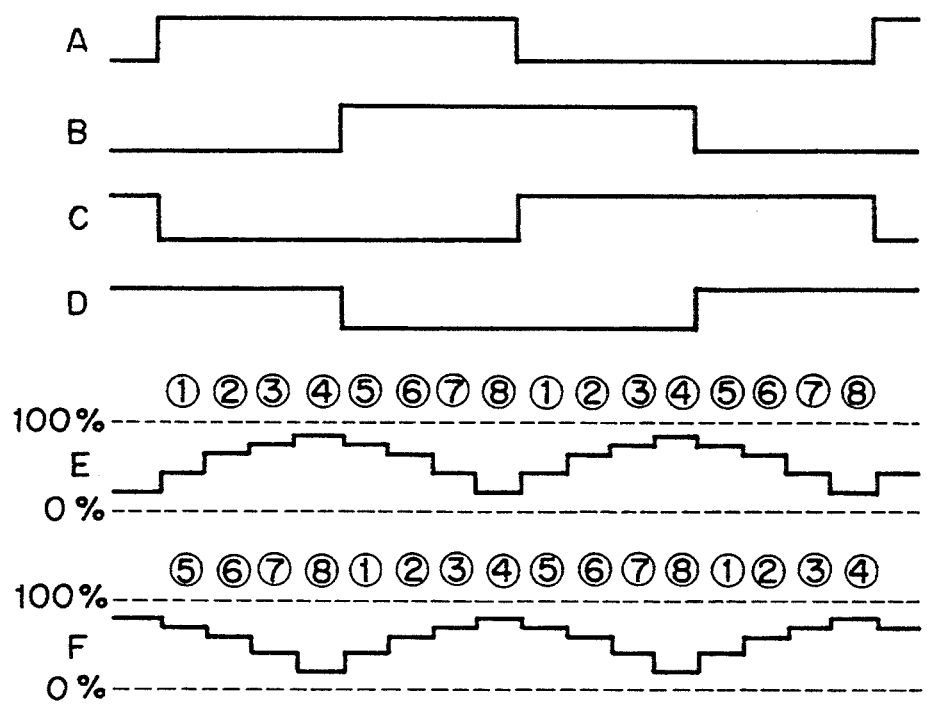
FIG. 4 shows a motor drive waveforms in accordance with the PWM duty factors of FIG. 3.

Motor drive waveforms based on the PWM duty factor data of FIG. 3 are shown in FIG. 4. The signal waveforms E and F herein are not actual pulse waveforms but they represents duty factors of the pulses by signal levels thereof. In FIG. 4, the microcontroller 1 changes the drive signals A and C and sets the duty factor of the PWM pulse E to 40% in accordance with the numeric value 40 stored in the address 1 of the ROM 10. Then, after the elapse of one quarter of the step period, it sets the duty factor of the PWM pulse E to 60% in accordance with the numeric value 60 stored in the address 2 of the ROM 10. Similarly, the PWM data are sequentially read from the ROM 10 to set the duty factors. For the PWM pulse F, the value which is shifted by 90 degrees from the pulse E is set. Accordingly, when the data read from the address 1 is 10 set to E, the data read from the address 5 is set to F. In this manner, the current flowing in the motor can be controlled at one quarter period of the step period and the same effect as that of a prior art drive method known as a 1–2 phase drive is attained. Namely, by causing the current waveform of the motor to approach a sine wave, the motor can be driven at a high efficiency and with low noise. Since the current flowing in the motor is affected by an inductance of the motor winding and a counter-electromotive force, the PWM duty factor is generally not proportional to the motor current but the current waveform can be controlled to be a sine wave by storing the duty factor data corrected to compensate for the affect in the ROM 10.

As described above, by changing the PWM duty factor in one step of the motor drive, the motor current waveform approaches sine wave and the operation of the motor at a high efficiency and with the low vibration is attained. In the present embodiment, the PWM duty factor is controlled at a period equal to one quarter of a step but the control timing may be further divided to attain a lower vibration.

<Embodiment 2>

A second embodiment of the present invention is now explained with reference to FIGS. 5 and 6.

In the first embodiment, the motor with a unipolar drive was shown although the present invention is applicable to a motor with a bipolar drive. In the second embodiment, the present invention is applied to the motor with a bipolar drive.

Figure 5:
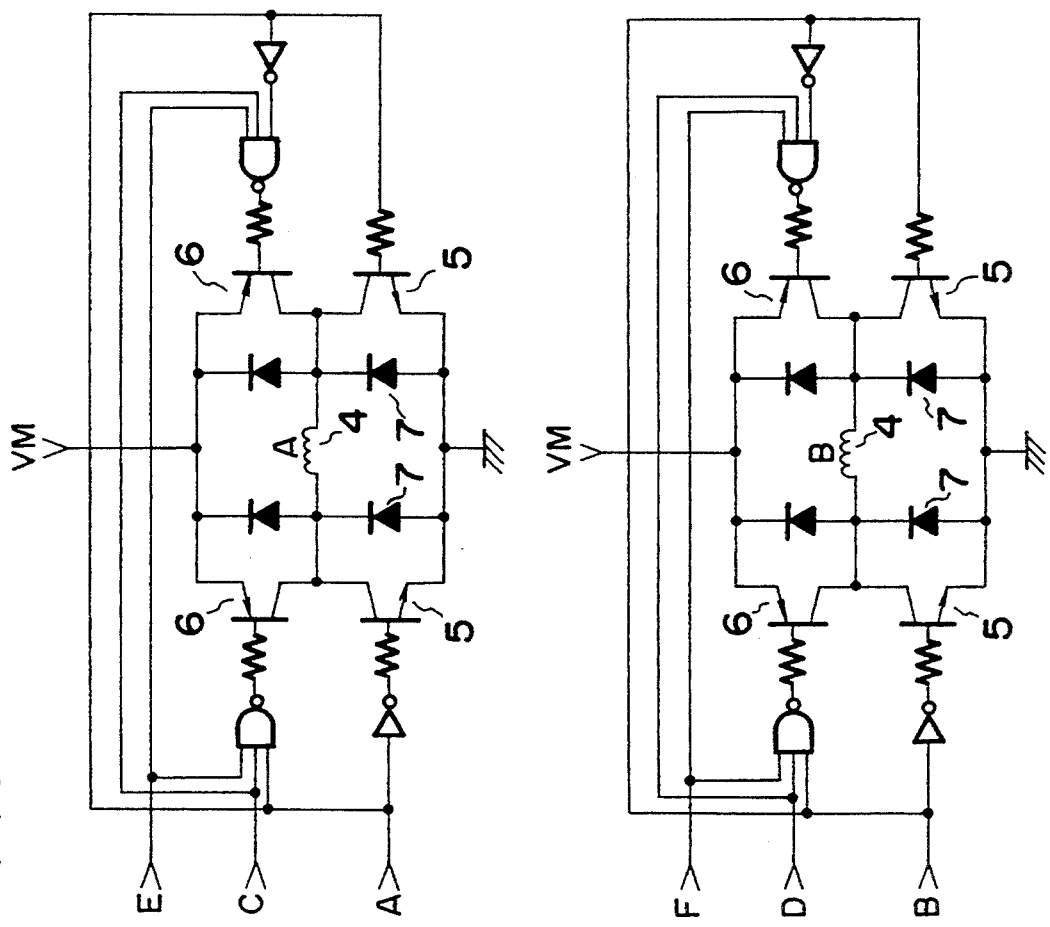
FIG. 5 shows a drive circuit of a stepping motor in accordance with a second embodiment of the present invention.
Figure 5:
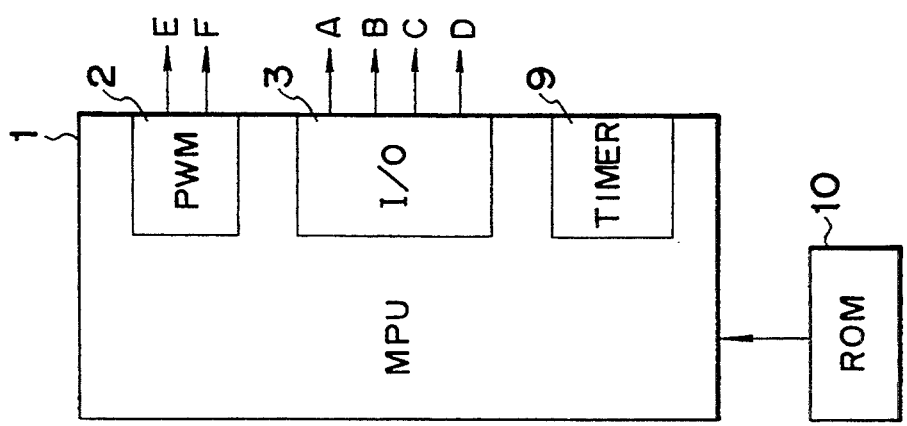
Figure 6:
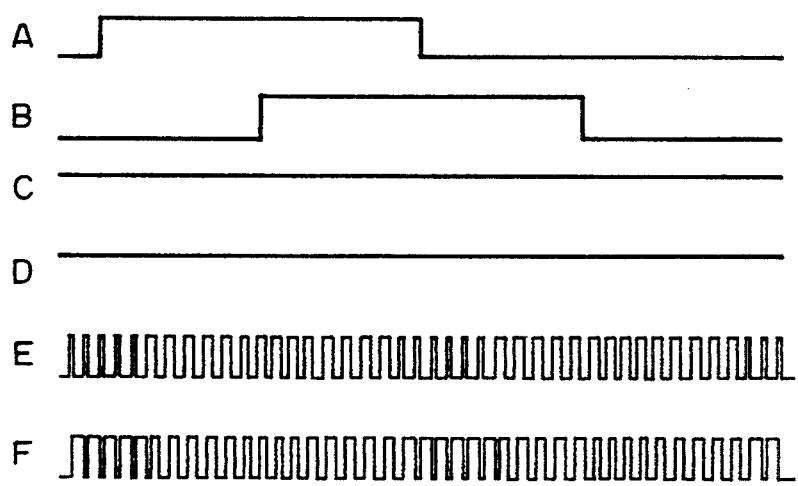
Fig. 6 shows control signal waveforms of the stepping motor shown in FIG. 5.

FIG. 5 shows a block diagram of a configuration of a motor drive circuit in the present embodiment.

In FIG. 5, numeral 1 denotes a microcontroller for controlling a motor, numeral 2 denotes a pulse width modulation unit (hereinafter a PWM unit) built in the microcontroller 1 for outputting pulse signals E and F of variable frequency and variable duty factor, numeral 3 denotes an output port built in the microcontroller 1 for generating coded stepping motor drive signals A, B, C and D, numeral 4 denotes a bipolar-connected 2-phase stepping motor, numeral 5 denotes a transistor for selecting phase excitation and a direction of current of the stepping motor 4 by the drive signals A and B, numeral 6 denotes a transistor for controlling the current flowing in the stepping motor 4 by the pulse signals E and F and selecting the phase excitation and the direction of current by the drive signals A, B, C and D, numeral 7 denotes a flywheel diode for establishing a path for the flow of a current when the transistor 6 is turned off, numeral 9 denotes a programmable timer unit built in the microcomputer 1, and numeral 10 denotes a ROM which stores data such as a drive speed of the motor 4 and the PWM duty factors. The data of the ROM is read by the microcontroller 1.

In the above configuration, the drive signals A and B are signals for selecting the direction of the current flowing in the motor winding 4 and they are supplied to the transistors 5 and 6. The drive signals C and D are signals for controlling the turning on/off the current in the motor winding 4 and they are supplied to the transistor 6. A basic control is same as that of the embodiment 1 but in the 2-phase excitation, the motor phase can be controlled by only the drive signals A and B. Waveforms of the control signals therefor are shown in FIG. 6. In FIG. 6, the directions of the currents flowing in the two motor windings 4 are controlled by the drive signals A and B and power supplied to the motor windings 4 are controlled by the duty factors of the pulse signals E and F.

As described above, a similar motor control to that of the embodiment 1 is attained for the motor of the bipolar winding.

<Embodiment 3>

A third embodiment of the present invention is now explained.

In the first and second embodiments, the methods for setting the PWM duty factors were explained, but in an actual motor operation, the rotation speed is frequently varied by slow up/down. In the present embodiment, a method is provided for setting the PWM duty factors when the motor rotation speed is varied.

In the stepping motor, the higher the drive frequency, the slower the rise of the current due to the inductance of the motor winding. Further, the higher the rotation speed, the larger the generated counter-electromotive force and the harder the current flows. As a result, when the setting of the PWM duty factors is constant, the higher the rotation speed, the more the current flowing in the motor is reduced and the smaller the generated torque. In order to prevent this, it is necessary to increase the PWM duty factor as the rotation speed increases.

FIG. 7 shows an example of data of the PWM duty factors for the slow-up of the motor. It is stored in the ROM as it is in the embodiment 1. In FIG. 7, N denotes a step number, P denotes a step period and each line denoted by numerals 1 to 8 shows duty factor data as it does in FIG. 3. It is seen from the fact that the step numbers are 1 to 10, that ten steps are required for the slow-up in the present embodiment. In step 1, a step period is 5000 μs as shown by 5000 for a step period P in the first line of FIG. 7. During this period, the PWM duty factor is set by using the PWM duty factor data in the first line of FIG. 7. The method for setting the duty factor is same as that of the embodiment 1. In a step 2, the step period is 3830 μs. During this period, the PWM duty factor is set by using the PWM duty factor data in the second line of FIG. 7. The step period differs from step to step but the PWM duty factor is always set at every one quarter of the step period by adjusting the time setting of the timer. The step period and the PWM duty factor are sequentially set up to a step 10. In steps 11 and et seq, the same step period and the PWM duty factor as those of the step 10 are used. In this manner, the PWM duty factor for the rotation speed is set even when the motor rotation speed changes and the current can be maintained to be constant.

In the present embodiment, the PWM duty factor data is prepared for each step. Alternatively, one PWM duty factor data may be provided for every several steps to reduce the volume of data and save the ROM capacity. While the slow-up of the motor is explained in the present emodiment, such control may be performed in the same manner for the slow-down.

It is possible to increase the current flowing in the motor only in the slow-up mode by merely changing the setting of the PWM duty factor data. During the acceleration of the motor, an acceleration torque as well as a load torque, are required. As a result, a large torque may be needed in the slow-up mode compared to the torque needed for a constant speed operation. Even in such a case, the current in the slow-up mode can be readily increased to increase the torque by merely changing the setting of the PWM duty factor data. In this manner, in the present embodiment, the torque can be adjusted by merely changing the setting of the PWM duty factor data so that a highly efficient motor operation is attained.

In accordance with the present invention, a circuit configuration which permits the rotation of the motor at a higher speed than that in the constant voltage drive system and simpler and less expensive than that of the constant current system is attained. Further, since the current flowing in the motor is rendered sinusoidal, a low vibration and a low noise motor operation is attained. Further, since the power is supplied in accordance with the rotation speed by changing the PWM duty factor, the motor can be rotated without the necessity to supply unnecessary power so that the saving of the power consumption and the reduction of the noise in the low speed operation are attained.

An application of the present invention may be the drive of a carriage motor used in the horizontal scan of a serial printer. In this case, the advantages of high speed, low cost, low noise and low power consumption are attained. Particularly in an ink jet printer such as a bubble jet printer which generates substantially no print noise, the application of the present invention offers a great advantage in reducing the noise.

While not explained in the embodiments, the motor drive circuit of FIG. 1 and 5 may be implemented by an integrated circuit to reduce a packaging area and cost.

What is claimed is:

1. A stepping motor control system comprising:
   a stepping motor;
   drive means for driving said stepping motor; said drive means including changeover means for changing an excitation phase of an excitation current supplied to an excitation coil of said stepping motor and switching means for controlling the excitation current supplied to said stepping motor by applying a pulse signal of a present duty factor;
   step drive signal generation means for generating a step drive signal supplied to said changeover means for step-driving said stepping motor;
   pulse generation means for generating said pulse signal of a preset duty factor supplied to said switching means of said drive means;
   memory means for storing a plurality of duty factor data of said pulse signal; and
   changing means for changing the duty factor of said pulse signal generated by said pulse generation means in accordance with a plurality of duty ratio data stored in said memory means, said changing means dividing a single driving range of said stepping motor into a plurality areas and varying the duty ratio in the respective divided areas.

2. A stepping motor control system according to claim 1 wherein the duty factor data in said memory means are set such that a drive current waveform of said stepping motor is a sinusoidal wave.

3. A stepping motor control system according to claim 1 wherein different one of the plurality of duty factor data of said memory means is used for a different drive step of said stepping motor.

4. A stepping motor control system comprising:
   a stepping motor;
   drive means for driving said stepping motor; said drive means including changeover means for changing an excitation phase of an excitation current supplied to an excitation coil of said stepping motor and switching means for controlling the excitation current supplied to said stepping motor by applying a pulse signal of a preset duty factor;
   step drive signal generation means for generating a step drive signal supplied to said changeover means for step-driving said stepping motor;
   pulse generation means for generating said pulse signal of a preset duty factor supplied to said switching means of said drive means;
   memory means for storing a plurality of duty factor data of pulse signal;
   a timer for counting a timing to generate the step drive signal and a timing to change the duty factor; and
   control means for changing the duty factor of the pulse signal generated by said pulse generation means in accordance with a plurality of duty ratio data stored in said memory means, said control means dividing a single driving range of said stepping motor into a plurality areas by said timer and varying the duty ratio in the respective divided areas.

5. A stepping motor control system according to claim 4 wherein said control means is a microcontroller having said step drive signal generation means, said pulse generation means and said timer therein.

6. A stepping motor control system according to claim 5 wherein said pulse generation means is pulse width modulation means of variable frequency and variable duty factor.

* * * * *

UNITED STATES PATENT AND TRADEMARK OFFICE
CERTIFICATE OF CORRECTION

PATENT NO. : 5,446,358
DATED : August 29, 1995
INVENTOR(S) : KAZUHIRO NAKATA

It is certified that error appears in the above-indentified patent and that said Letters Patent is hereby corrected as shown below:

ON THE TITLE PAGE

[56] References Cited

OTHER PUBLICATIONS

Line 3, "60-0342597." should read --60-032597.--.

COLUMN 1

Line 33, "high ." should read --high.--.
Line 40, "problem ," should read --problem,--.

COLUMN 3

Line 11, "10" should be deleted.

UNITED STATES PATENT AND TRADEMARK OFFICE
CERTIFICATE OF CORRECTION

PATENT NO. : 5,446,358
DATED : August 29, 1995
INVENTOR(S) : KAZUHIRO NAKATA

It is certified that error appears in the above-indentified patent and that said Letters Patent is hereby corrected as shown below:

COLUMN 4

Line 38, close up right margin.
    Line 39, close up left margin.

COLUMN 5

Line 42, "motor;" should read --motor,--.

COLUMN 6

Line 11, "claim 1" should read --claim 1,--.
    Line 15, "claim 1" should read --claim 1,--.
    Line 20, "motor;" should read --motor,--.
    Line 47, "claim 4" should read --claim 4,--.
    Line 51, "claim 5" should read --claim 5,--.

Signed and Sealed this

Sixteenth Day of January, 1996

Attest:

BRUCE LEHMAN

Attesting Officer     Commissioner of Patents and Trademarks